N. B. SEABROOK.
DIFFERENTIAL AXLE.
APPLICATION FILED JULY 6, 1909.

961,376.

Patented June 14, 1910.

Witnesses:

Inventor:
Norman B. Seabrook

UNITED STATES PATENT OFFICE.

NORMAN B. SEABROOK, OF LOS ANGELES, CALIFORNIA.

DIFFERENTIAL AXLE.

961,376. Specification of Letters Patent. Patented June 14, 1910.

Application filed July 6, 1909. Serial No. 506,228.

*To all whom it may concern:*

Be it known that I, NORMAN B. SEABROOK, a subject of the King of England, residing at Los Angeles, in the county of Los Angeles and State of California, have invented new and useful Improvements in Differential Axles, of which the following is a specification.

This invention relates to an improved construction of differential railway axles of a type wherein the coupling comprises telescopic parts which are held together by their frictional engagement. In such axles the construction heretofore employed has been such that one of the axle members had a journal fit in one member of the coupling, while the other axle member had a press fit with another member of the coupling, and the journaling of the axle members was not completed until the two sleeves of the coupling had been forced together with a press fit which rendered it exceedingly difficult to secure the proper journal fit, as in pressing the parts together great care had to be exercised to not cause the journaled portions to bind; moreover the journal portions were hidden by the telescopic parts of the coupling and this made the operation still more difficult.

The main object of the present invention is to enable that axle member which has a journal fit to be fitted with the proper journal fit to its member of the coupling before the other part of the coupling is assembled and, thereby it is possible to produce the journal fit with great accuracy and comparative ease, and as the parts are accessible, the operation is also rendered much easier.

A further object of the invention is to greatly reduce the amount of metal required for making the coupling without weakening the coupling in any way or losing any advantages which such coupling had heretofore possessed.

Figure 1:
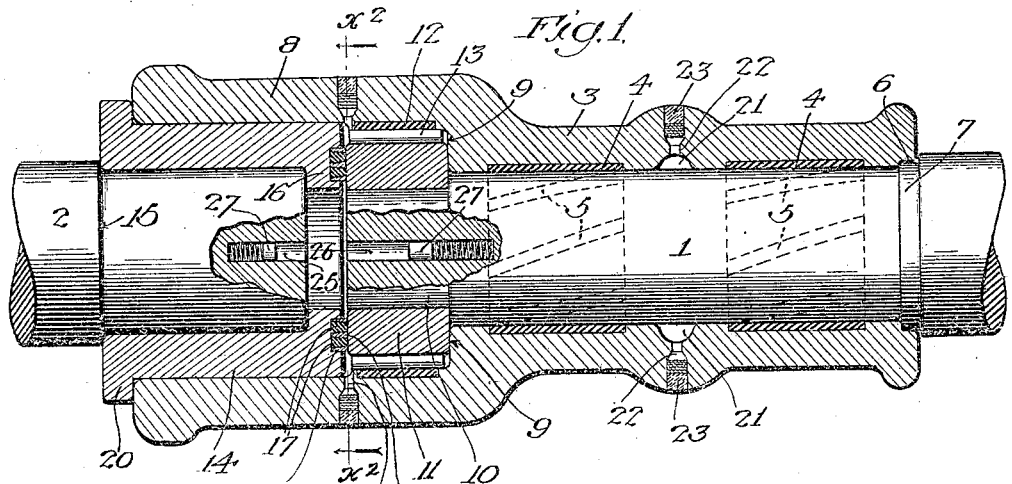
Figure 2:
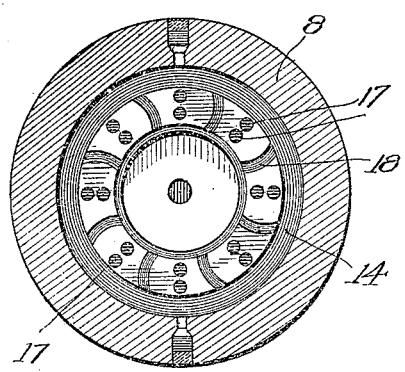
Figure 3:
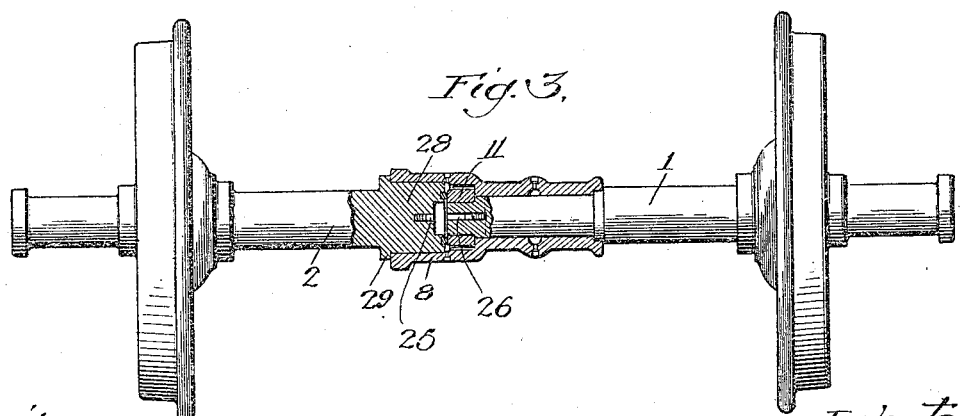

Referring to the drawings:—Figure 1 is an enlarged longitudinal, sectional view through the coupling, the axle members being in elevation with portions only thereof in section. Fig. 2 is a section on line $x^2$—$x^2$ Fig. 1. Fig. 3 is a front elevation on a reduced scale of a slightly modified form of coupling.

1 designates one axle member and 2 the other axle member. The axle member 1 is rotatably mounted in a main sleeve 3 which, if desired, may be provided with babbitt rings 4, preferably formed with rifle grooves 5 to permit the passage of lubricant. These babbitt rings may be dispensed with if desired. A shoulder 6 at the outer end of the main sleeve 3 co-acts with a step-shoulder 7 on the axle member 1 to limit end thrust. The main sleeve 3 has an enlarged end 8 forming a shoulder 9. The axle member 1 has a reduced end 10 and a retaining collar 11 is secured on the reduced end 10, the latter being headed to hold the retaining collar in place and the retaining collar abutting the shoulder to hold the axle member 1 in place in the main sleeve 3 and limit the end movement thereof. The enlarged end 8 of the main sleeve is annularly grooved to receive a babbitt ring 12 and rollers 13 are arranged between the retaining collar 11 and the ring 12 for reducing friction, although, if desired, either rollers 13, babbitt ring 12, or both, may be eliminated.

The axle member 2 is rigidly secured with a press fit within a bushing 14, the axle member 2 having a shoulder 15 which abuts the outer edge of the bushing and the bushing having an inner annular flange 16 against which the inner end of the axle member 2 abuts. The bushing 14, being thus firmly secured to the axle member 2 and being retained thereon by the frictional engagement therewith, becomes virtually a part of the axle member 2. The inner end of the bushing 14 is recessed to receive a lubricating ring 17 formed of graphite pedestals 18 embedded in babbitt 19, the ring 17 protruding slightly from the bushing 14 and bearing against the inner end of the retaining collar 11. The other end of the bushing 14 has a flange 20 which abuts against the enlarged end 8 of the main sleeve and the bushing 14 is rigidly secured within the enlarged end 8 with a press fit, so that the axle member 2, bushing 14 and main sleeve 3 all revolve together as one piece while the axle member 1 and collar 11 revolve within the main sleeve 3.

In assembling the coupling the axle member 1 and retaining collar 11 are first assembled in the main sleeve before the axle member 2 and bushing 14 are inserted, which enables a proper fitting of the axle member 1 and collar 11, as the parts are all in sight and accessible for easy manipulation in testing and regulating the journal fit and it is thus possible to secure a perfect journal fit between these members before the other parts of the coupling are assembled. After the journal fit of the axle member with collar 11 has been obtained, the axle member 2 with bushing 20 is inserted in the enlarged end 8 and it will be noted that such insertion does not in any way affect or modify the journal fit which has already been secured between axle member 1 and main sleeve 3, so that after all parts of the coupling have been assembled the journal fit of the axle member 1 is perfect. Before inserting the axle member 2, the lubricant may be introduced directly through the open end of the sleeve 3 into the interior thereof, which obviates employing a charging pump for introducing lubricant through small passages as has heretofore been necessary. Another advantage of this construction is that less metal is used than has heretofore been required, as with this construction the axle member 2 fits tight within the bushing 14 and thus not having a journal fit therein as in the previous constructions, does not require to be so long, and yet the parts when assembled afford as long a journal fit as heretofore between the loose axle member and the coupling, while the length or area of the tight fitting parts is as great as heretofore.

Lubricant may be introduced into an annular groove 21 in the main sleeve through passages 22 which may be sealed at 23 and lubricant may also be introduced into the space between the collar 11 and bushing 14 through passages 24 which may also be sealed. If desired, lubricant receiving chambers 25, 26 may be formed in the inner end of each axle member 1, 2, each chamber being provided with a spring pressed follower 27, the followers leaving as the lubricant is introduced to enable the chambers to be filled with the lubricant and the spring pressed plungers 2 to automatically feed the lubricant from the chamber as the lubricant wears away from the bearing portions.

Fig. 3 shows a modified form in which the bushing 14 is omitted and the axle member 2 is forged with an enlarged end 28 which is forced with a press fit into the enlarged end 8 of the main sleeve. This view also shows the rollers 13 omitted and babbitt rings 4 omitted. The parts are assembled in this form as in the previous one, the axle member 1 being first assembled within the main sleeve and the proper journal fit of it secured therein, after which the axle member 2 with the enlarged end 28 is forced with a press fit into the enlarged end 8. The enlarged end 28 has a flange 29 which abuts the end of the main sleeve similar to the flange 20 of the bushing 14.

What I claim is:—

1. A differential axle comprising two axle members, a retaining ring on one axle member, a sleeve with an internally enlarged end to receive the retaining ring and form a shoulder to abut said ring, said end of the sleeve being secured by frictional engagement on the other axle member, the other end of said sleeve having a journal fit on the first specified axle member.

2. A differential axle comprising a sleeve, a bushing secured therein by frictional engagement, an axle member secured in the bushing by frictional engagement, and another axle member journaled in the sleeve.

3. A differential axle comprising a sleeve with an internal shoulder, an axle member journaled in the sleeve, a retaining collar on the axle member abutting said shoulder, a bushing frictionally retained in the sleeve, and another axle member frictionally retained in the bushing.

4. A differential axle comprising a sleeve with an enlarged end, a bushing frictionally secured in the enlarged end, an axle member frictionally secured in the bushing, and an axle member journaled in the other end of the sleeve.

5. A differential axle comprising a sleeve with an internal shoulder, an axle member journaled in the sleeve, a retaining collar on the axle member bearing against the shoulder, a bushing frictionally retained in the sleeve, the bushing having a flange which abuts the end of the sleeve, and an axle member frictionally retained in the bushing.

6. A differential axle comprising a sleeve, an axle member journaled in the sleeve, a bushing frictionally retained in the sleeve and having an inwardly projecting flange at its inner end, and an axle member frictionally retained in the bushing with its inner end abutting the flange of the bushing.

7. A differential axle comprising a sleeve, an axle member journaled in the sleeve, a bushing frictionally retained in the sleeve and having an inwardly projecting flange at its inner end, the bushing having a flange which abuts the end of the sleeve, and an axle member frictionally retained in the bushing with its inner end abutting the flange of the bushing.

8. A differential axle comprising two axle members, a bushing rigidly secured to one member, a sleeve rigidly secured to the bushing, and the other axle member being journaled in the sleeve, the inner end of one axle member having a lubricant chamber, and a spring pressed follower in the chamber.

9. A differential axle comprising two axle members, a bushing rigidly secured to one member, a sleeve rigidly secured to the bushing, and the other axle member being journaled in the sleeve, there being a space between the ends of the axle members and each axle member having a lubricant chamber communicating with said space, and spring pressed followers in each lubricant chamber.

10. A differential axle comprising two axle members, a bushing rigidly secured to one member, a sleeve rigidly secured to the bushing, and the other axle member being journaled in the sleeve, and a lubricant ring in the inner end of the bushing and bearing against the end of the latter axle member.

11. A differential axle comprising a sleeve with an internal shoulder, an axle member journaled in the sleeve, a retaining collar on the axle member abutting said shoulder, a bushing frictionally retained in the sleeve, another axle member frictionally retained in the bushing, and antifriction rollers between the retaining collar and sleeve.

12. A differential axle comprising a sleeve with an internal shoulder, an axle member journaled in the sleeve, a retaining collar on the axle member abutting said shoulder, a bushing frictionally retained in the sleeve, another axle member frictionally retained in the bushing, antifriction rollers between the retaining collar and sleeve, the sleeve being recesses, and a babbitt ring in the recess against which the rollers bear.

13. A differential axle comprising two axle members, a bushing rigidly secured to one member, a sleeve rigidly secured to the bushing, and the other axle member being journaled in the sleeve, the sleeve having an internal groove encircling the latter axle member, and the sleeve having sealed passages extending to the groove.

14. A differential axle comprising two axle members, a bushing rigidly secured to one member, a sleeve rigidly secured to the bushing, and the other axle member having a journal fit in the sleeve, means for retaining the latter axle member in said sleeve the sleeve having annular grooves, and babbitt rings in the grooves.

In testimony whereof, I have hereunto set my hand at Los Angeles, California, this 19th day of June, 1909.

NORMAN B. SEABROOK.

In presence of—
G. T. HACKLEY,
FRANK L. A. GRAHAM.